United States Patent
Cazaux et al.

(10) Patent No.: US 10,753,766 B2
(45) Date of Patent: Aug. 25, 2020

(54) METHOD AND ELECTRONIC DEVICE FOR MANAGING THE DISPLAY OF AN AIRCRAFT FLIGHT PROFILE, RELATED COMPUTER PROGRAM AND ELECTRONIC DISPLAY SYSTEM

(71) Applicant: THALES, Courbevoie (FR)

(72) Inventors: Patrick Cazaux, Merignac (FR); Sarah Dupont, Merignac (FR); Charlotte Dietrich, Merignac (FR)

(73) Assignee: THALES, Courbevoie (FR)

( * ) Notice: Subject to any disclaimer, the term of this patent is extended or adjusted under 35 U.S.C. 154(b) by 5 days.

(21) Appl. No.: 16/286,408

(22) Filed: Feb. 26, 2019

(65) Prior Publication Data
US 2019/0277654 A1 Sep. 12, 2019

(30) Foreign Application Priority Data

Mar. 9, 2018 (FR) .................................. 18 00204

(51) Int. Cl.
G01C 23/00 (2006.01)
B64D 43/00 (2006.01)
G06F 3/14 (2006.01)
G01C 21/20 (2006.01)
G08G 5/00 (2006.01)

(52) U.S. Cl.
CPC ............ G01C 23/00 (2013.01); B64D 43/00 (2013.01); G01C 21/20 (2013.01); G06F 3/14 (2013.01); G08G 5/003 (2013.01)

(58) Field of Classification Search
None
See application file for complete search history.

(56) References Cited

U.S. PATENT DOCUMENTS

| | | | | |
|---|---|---|---|---|
| 4,825,374 A | * | 4/1989 | King ................... | G01C 23/005 244/186 |
| 5,995,901 A | * | 11/1999 | Owen ................. | G01C 23/005 340/974 |
| 6,980,892 B1 | * | 12/2005 | Chen .................... | G01C 21/005 340/970 |
| 8,607,153 B2 | * | 12/2013 | Kramer ................ | G06T 11/206 345/440 |
| 9,100,661 B2 | * | 8/2015 | Alshina ................. | H04N 19/98 |
| 9,128,995 B1 | * | 9/2015 | Fletcher ............. | G06F 3/04842 |

(Continued)

FOREIGN PATENT DOCUMENTS

FR 2895793 A1 7/2007

OTHER PUBLICATIONS

Preliminary Search Report issued in related French Application No. 1800204, dated Nov. 27, 2018.

*Primary Examiner* — David H Chu
(74) *Attorney, Agent, or Firm* — Arent Fox LLP (57) ABSTRACT

This method for managing the display of a flight profile of an aircraft is implemented by an electronic management device.

It comprises computing a reference altitude for the display of a vertical flight profile; determining a range of altitudes for the display of said vertical profile, the range of altitudes being determined as a function of the computed reference altitude, the reference altitude being computed as a function of a current altitude, an altitude interval to be displayed and at least one property relative to an estimated evolution of the altitude of the aircraft from said current altitude.

11 Claims, 6 Drawing Sheets

(56) References Cited

U.S. PATENT DOCUMENTS

| | | | |
|---|---|---|---|
| 10,302,451 B1* | 5/2019 | Kim | G05D 1/0661 |
| 2006/0004496 A1* | 1/2006 | Tucker | G01C 23/00 |
| | | | 701/4 |
| 2007/0179684 A1* | 8/2007 | He | G01C 23/00 |
| | | | 701/3 |
| 2007/0222643 A1* | 9/2007 | Winkler | G01C 23/005 |
| | | | 340/977 |
| 2011/0304626 A1* | 12/2011 | Fotev | G06F 40/18 |
| | | | 345/428 |
| 2012/0139778 A1* | 6/2012 | Bunch | G01S 13/953 |
| | | | 342/26 B |
| 2017/0039863 A1* | 2/2017 | Mashio | G08G 5/02 |
| 2018/0095176 A1* | 4/2018 | Raghupathy | G01C 5/06 |
| 2018/0370645 A1* | 12/2018 | Durand | G01C 23/005 |

* cited by examiner

METHOD AND ELECTRONIC DEVICE FOR MANAGING THE DISPLAY OF AN AIRCRAFT FLIGHT PROFILE, RELATED COMPUTER PROGRAM AND ELECTRONIC DISPLAY SYSTEM

CROSS-REFERENCE TO RELATED APPLICATIONS

This application is a U.S. non-provisional application claiming the benefit of French Application No. 18 00204, filed on Mar. 9, 2018, which is incorporated herein by reference in its entirety.

FIELD

The present invention relates to a method for managing the display of a flight profile of an aircraft, the method being implemented by an electronic display management device.

The display management method comprises computing a reference altitude for the display of a vertical flight profile, determining a range of altitudes for the display of said vertical profile, the range of altitudes being determined as a function of the computed reference altitude.

The invention also relates to a non-transitory computer-readable medium including a computer program including software instructions which, when executed by a computer, implement such a display management method.

The invention also relates to an electronic device for managing the display of a flight profile of an aircraft.

The invention also relates to an electronic system for displaying a flight profile of an aircraft, comprising a display screen and such an electronic display management device configured to manage the display of the flight profile on the display screen.

The invention then relates to the field of man-machine interfaces (MMI) for piloting an aircraft, preferably intended to be installed in an aircraft cockpit.

The invention in particular relates to the display of a flight profile of the aircraft on a display screen. The display of the flight profile is generally separated into 2 separate zones, namely a first zone for displaying a horizontal flight profile, also called navigation display and denoted ND and a second zone for displaying a vertical flight profile, also called vertical display and denoted VD.

The horizontal flight profile is a projection of the flight profile in a horizontal plane, and the vertical flight profile is a projection of the flight profile in a vertical plane, perpendicular to the horizontal plane.

BACKGROUND

Traditionally, during the use of a device for managing the display of a flight profile of an aircraft, a user, such as a pilot of the aircraft, has the possibility of selecting the display of the flight profile from among at least two display modes, in particular a tracking mode and a flight plan mode.

When the selected mode for the display of the flight profile is the tracking mode, a horizontal axis belonging to said horizontal plane is a straight line passing through the position of the aircraft and extending in a movement direction of the aircraft, or in a direction of extension of the fuselage of the aircraft, or in a direction of a weather radar, or in a specific direction designated by the user.

When the mode selected for the display of the flight profile is the flight plan mode, a horizontal axis is defined by following the segments of the flight plan (straight and curved).

Irrespective of the mode selected from among the tracking mode and the flight plan mode, the vertical reference axis is defined along the axis of the standard barometric or baro-corrected altitudes, corresponding to the QNH aeronautic code.

Known from document U.S. Pat. No. 5,997,901 is a flight management system comprising a display unit for displaying flight plan information inside a viewing zone on a display screen, in which the resolution of a vertical profile of the flight plan is automatically adjusted as a function of altitude information of the flight plan to be displayed. The resolution of the vertical scale is adjusted automatically such that it varies inversely with the maximum altitude of the flight trajectory to be displayed.

However, the higher the maximum altitude of the flight trajectory to be displayed is, the lower the resolution of the vertical scale is and the less legible the displayed vertical profile will be. A lower resolution indeed prevents observing certain details of the vertical profile. Such management of the display of the vertical profile of the flight plan is then not optimal.

SUMMARY

The aim of the invention is then to propose a method and an electronic device for managing the display of a flight profile of an aircraft, making it possible to offer better readability of the displayed vertical flight profile.

To that end, the invention relates to a method for managing the display of a flight profile of an aircraft, the method being implemented by an electronic display management device and comprising the following steps:
  computing a reference altitude for the display of a vertical flight profile,
  determining a range of altitudes for the display of said vertical profile, the range of altitudes being determined as a function of the computed reference altitude,
  the reference altitude being computed as a function of a current altitude, an altitude interval to be displayed and at least one property relative to an estimated evolution of the altitude of the aircraft from said current altitude.

Thus, the display management method according to the invention makes it possible to adapt the displayed range of altitudes of the vertical profile, in particular the reference altitude taken into account to determine said range of altitudes, as a function of an estimated evolution of the altitude of the aircraft from the current altitude taken into account.

As an example, when a mode selected for the display of the flight profile is a tracking mode, the current altitude is an instantaneous altitude of the aircraft and the estimated evolution of the altitude of the aircraft is an estimated altitude variation of the aircraft during a next time interval and from the instantaneous altitude.

When the mode selected for the display of the flight profile is a flight plan mode for the display of the profile of a flight plan, the current altitude is the altitude of the next element to be displayed in the range of altitudes among the altitude of the aircraft and the altitude of the next point of the flight plan. The estimated altitude evolution of the aircraft is then defined from a maximum altitude from among the next points of the flight plan and/or a minimum altitude from among the next points of the flight plan.

One skilled in the art will further understand that the altitude of the aircraft in the flight plan is the altitude at which the aircraft is found within the flight plan, in light of a potential interaction by the user. Indeed, when the user interacts with the management device of the display of the flight profile in flight plan mode, it is possible to view the next points of a predicted trajectory of the aircraft along the flight plan. When this position varies along the predicted, i.e., estimated, flight plan, then the associated altitude in the flight plan is also likely to vary.

One skilled in the art will then observe that the current altitude in flight plan mode does not necessarily correspond to an instantaneous altitude of the aircraft. Instantaneous altitude refers to the altitude measured at the moment in time, i.e., the moment where the user interacts with the flight management device.

According to other advantageous aspects of the invention, the display management method comprises one or more of the following features, considered alone or according to all technically possible combinations:

- at least one property relative to an estimated evolution of the altitude of the aircraft is chosen from among the group consisting of: an estimated altitude variation of the aircraft during a next time interval and from the current altitude, a maximum altitude of the aircraft from among the next points of a flight plan and a minimum altitude of the aircraft from among the next points of the flight plan;
- the method further comprises a step for acquiring a selected display mode of the flight profile from among a tracking mode and a flight plan mode, and
- when the acquired display mode is the tracking mode, the current altitude is an instantaneous altitude of the aircraft and the property relative to the estimated evolution of the altitude of the aircraft is an estimated altitude variation of the aircraft during a next time interval and from the instantaneous altitude;
- the method further comprises a step for acquiring a selected display mode of the flight profile from among a tracking mode and a flight plan mode, and
- when the acquired display mode is the flight plan mode, the current altitude is the altitude of the next element to be displayed in the range of altitudes from among the altitude of the aircraft and the altitude of the next point of the flight plan, and at least one property relative to the estimated evolution of the altitude of the aircraft depends on an altitude from among a maximum altitude of the aircraft from among the next points of the flight plan and a minimum altitude of the aircraft from among the next points of the flight plan;
- the method further comprises the following steps:
  computing a reference position for the display of the vertical profile, the reference position computed as a function of the current position of the aircraft, and
  determining a range of positions for the display of said vertical profile, the range of positions being determined as a function of the computed reference position and a position interval to be displayed;
- the altitude interval to be displayed depends on the position interval to be displayed;
- the method further comprises a step for displaying the vertical profile of the aircraft.

The invention also relates to a non-transitory computer-readable medium including a computer program including software instructions which, when executed by a computer, implement a display management method, as defined above.

The invention also relates to an electronic display management device configured to manage the display of a flight profile of an aircraft, comprising:

a computing module configured to compute a reference altitude for the display of a vertical flight profile, a determining module configured to determine a range of altitudes for the display of said vertical profile, the range of altitudes being determined as a function of the computed reference altitude, the computing module being configured to compute the reference altitude as a function of a current altitude, an altitude interval to be displayed and at least one property relative to an estimated evolution of the altitude of the aircraft from said current altitude.

The invention also relates to an electronic system for displaying a flight profile of an aircraft, the system comprising a display screen and such an electronic display management device configured to manage the display of the flight profile on the display screen, the electronic display management device being as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
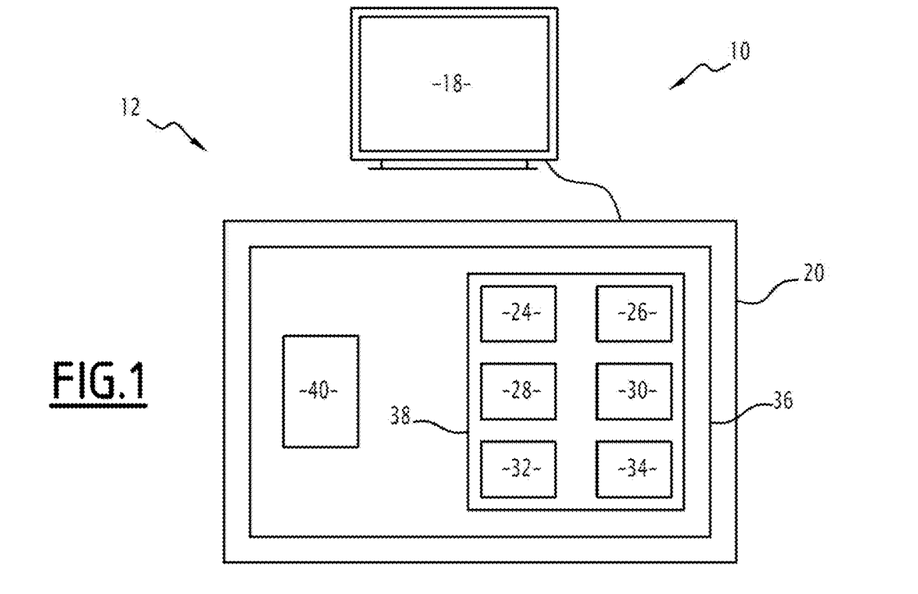
FIG. 1 is a schematic view of an electronic display system according to the invention, configured to display a flight profile of an aircraft.

In FIG. 1, an electronic display system 10 is configured to display at least one flight profile of an aircraft 12, namely a vertical flight profile 14 and/or a horizontal flight profile 16.

The electronic display system 10 comprises a display screen 18 and an electronic management device 20 that is configured to manage the display of at least one flight profile 14, 16 on the display screen 18, the management device 20 being connected to the display screen 18.

Figure 4:
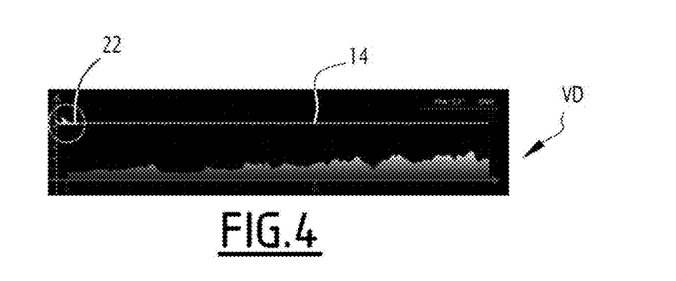
FIG. 4 is a view of the vertical flight profile, display on the vertical display VD, when a selected display mode is a tracking mode.
Figure 5:
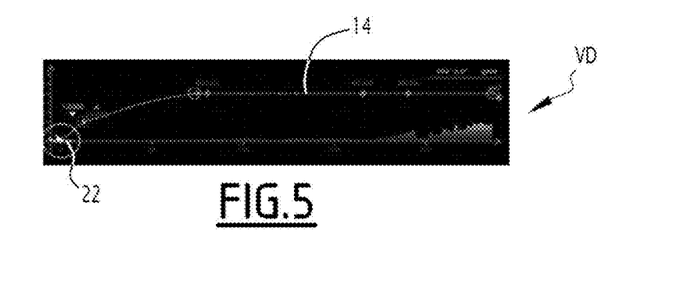
FIG. 5 is a view similar to that of FIG. 4, when the selected display mode is a flight plan mode.

The aircraft 12 is for example an airplane, as shown in FIGS. 4 and 5, where a symbol 22 depicting the aircraft 12 is in the shape of an airplane. Alternatively, the aircraft 12 is a helicopter, like in the example of FIG. 3 or FIGS. 11 to 14, for which the symbol 22 depicting the aircraft is in the shape of a helicopter. Also alternatively, the aircraft 12 is a drone piloted remotely by a pilot.

The flight profile of the aircraft 12 is known in itself, and corresponds to an estimate of the trajectory that the aircraft 12 will follow during its flight.

The vertical flight profile 14 is known in itself, and is a projection of the flight profile of the aircraft in a vertical plane containing a vertical reference axis and a horizontal reference axis. The vertical reference axis is defined along the axis of the standard barometric or baro-corrected altitudes, corresponding to the QNH aeronautic code.

The horizontal profile 16 is also known in itself, and is a projection of the flight profile of the aircraft 12 in a horizontal plane perpendicular to the vertical plane.

As is known in itself, during the use of the management device 20, the user, such as a pilot of the aircraft 12, has the possibility of selecting the display of the flight profile from among at least two display modes, in particular a tracking mode and a flight plan mode.

When the mode selected for the display of the flight profile is the tracking mode, the horizontal plane used for the projection of the horizontal profile 16 comprises the horizontal reference axis, which is a straight line passing through the position of the aircraft 12 and extending along a characteristic direction of the aircraft 12, such as its movement direction, the direction of extension of its fuselage, the direction of a weather radar of the aircraft 12, or a specific direction designated by the user.

When the selected display mode is the flight plan mode, the horizontal reference axis is defined by following the segments of the flight plan, straight and curved.

The electronic management device 20 comprises a first computing module 24 configured to compute a reference altitude $Alt_{ref}$ for the display of the vertical flight profile 14, and a first determining module 26 configured to determine a range of altitudes $Alt_{range}$ for the display of said vertical profile 14, the range of altitudes $Alt_{range}$ being determined as a function of the computed reference altitude $Alt_{ref}$.

The range of altitudes $Alt_{range}$ thus determined is then the range of altitudes visible when the vertical profile 14 is displayed. In other words, during the display of said vertical profile 14, the displayed portion of the vertical profile 14 is that for the altitudes belonging to the range of altitudes $Alt_{range}$ thus determined.

One skilled in the art will understand that said range of altitudes $Alt_{range}$ is then a range of values along the vertical reference axis, corresponding to the set of values capable of being displayed along said vertical axis at the considered moment in time.

An altitude interval $Alt_{int}$ corresponds to the difference between the maximum and minimum values of said set of values forming the range of altitudes $Alt_{range}$, or to the maximum deviation that may be displayed along said vertical axis. In other words, the altitude interval $Alt_{int}$ is equal to the deviation between the minimum and maximum values of the range of altitudes $Alt_{range}$.

Additionally, the electronic management device 20 comprises a second computing module 28 configured to compute a reference position $Pos_{ref}$ for the display of the vertical profile 14, the reference position $Pos_{ref}$ being computed as a function of a current position $Pos_c$ of the aircraft 12, and a second determining module 30 configured to compute a range of positions $Pos_{range}$ for the display of said vertical profile 14, the range of positions $Pos_{range}$ being determined as a function of the computed reference position $Pos_{ref}$ and a position interval $Pos_{int}$ to be displayed.

The range of positions $Pos_{range}$ thus determined is then the range of positions visible when the vertical profile 14 is displayed. In other words, during the display of said vertical profile 14, the displayed portion of the vertical profile 14 is that for the positions belonging to the range of positions $Pos_{range}$ thus determined.

One skilled in the art will similarly understand that said range of positions $Pos_{range}$ is then a range of values along the horizontal reference axis, corresponding to the set of values capable of being displayed along said horizontal axis at the considered moment in time.

The position interval $Pos_{int}$ corresponds to the difference between the maximum and minimum values of said set of values forming the range of positions $Pos_{range}$, or to the maximum deviation that may be displayed along said horizontal axis. In other words, the position interval $Pos_{int}$ is equal to the deviation between the minimum and maximum values of the range of positions $Pos_{range}$.

As an optional addition, the management device 20 also comprises an acquisition module 32 configured to acquire a selected display mode of the flight profile from among the tracking mode and the flight plan mode. The selection of the display mode is for example made by the user, or by another electronic device, connected to the electronic management device 20.

The management device 20 comprises a display module 34 configured to command the display of the flight profile, in particular the vertical profile 14, on the display screen 18.

In the example of FIG. 1, the electronic management device 20 comprises an information processing unit 36, for example made up of a memory 38 and a processor 40 associated with the memory 38.

In the example of FIG. 1, the first computing module 24, and the first determining module 26, as well as, optionally and additionally, the second computing module 28, the second determining module 30, the acquisition module 32 and the display module 34, are each made in the form of software, or a software unit, executable by the processor 40. The memory 38 of the electronic management device 20 is then able to store first computing software configured to compute the reference altitude $Alt_{ref}$ for the display of the vertical flight profile 14, first determining software configured to determine the range of altitudes $Alt_{range}$ for the display of said vertical profile 14. As an optional addition, the memory 38 of the electronic management device 20 is able to store second computing software configured to compute the reference position $Pos_{ref}$ for the display of the vertical profile 14 and second determining software configured to determine the range of positions $Pos_{range}$ for the display of said vertical profile 14. Also as an optional addition, the memory 38 of the electronic management device 20 is able to store acquisition software configured to acquire the selected display mode of the flight profile from among the tracking mode and the flight plan mode, and display software configured to command the display of the flight profile, in particular the vertical profile 14, on the display screen 18. The processor 40 is then able to execute each software application from among the first computing software, the first determining software, and as an optional addition, the second computing software, the second determining software, the acquisition software and the display software.

In an alternative that is not shown, the first computing module 24, the first determining module 26, as well as, optionally and additionally, the second computing module 28, the second determining module 30, the acquisition module 32 and the display module 36, are each made in the form of a programmable logic component, such as an FPGA (Field Programmable Gate Array), or in the form of a dedicated integrated circuit, such as an ASIC (Applications Specific Integrated Circuit).

When the electronic management device 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The first computing module 24 is configured to compute the reference altitude $Alt_{ref}$ as a function of a current altitude $Alt_c$, an altitude interval $Alt_{int}$ to be displayed and at least one property $Evol\_Alt_{est}$ relative to an estimated evolution of the altitude of the aircraft 12 from said current altitude $Alt_c$.

At least one property $Evol\_Alt_{est}$ relative to an estimated evolution of the altitude of the aircraft 12 is chosen from among the group consisting of: an estimated altitude variation $Var\_Alt_{est}$ of the aircraft 12 during a next time interval and from the current altitude $Alt_c$, a maximum altitude $Alt\_PV_{MAX}$ of the aircraft 12 from among the next points of a flight plan and a minimum altitude $Alt\_PV_{MIN}$ of the aircraft 12 from among the next points of the flight plan.

In other words, each property $Evol\_Alt_{est}$ is representative of an estimated evolution of the altitude of the aircraft 12 from said current altitude $Alt_c$.

When the acquired display mode is the tracking mode, the current altitude $Alt_c$ is an instantaneous altitude of the aircraft 12. In tracking mode, the property $Evol\_Alt_{est}$ relative to the estimated evolution of the altitude of the aircraft 12 is an estimated altitude variation $Var\_Alt_{est}$ of the aircraft 12 during a next time interval and from the instantaneous altitude.

For the tracking mode, examples of computation of the reference altitude $Alt_{ref}$ via the first computing module 24 will be described in more detail hereinafter, in light of the diagram 50 of states $E1_S$, $E2_S$, and $E3_S$ of FIG. 7.

Figure 9:
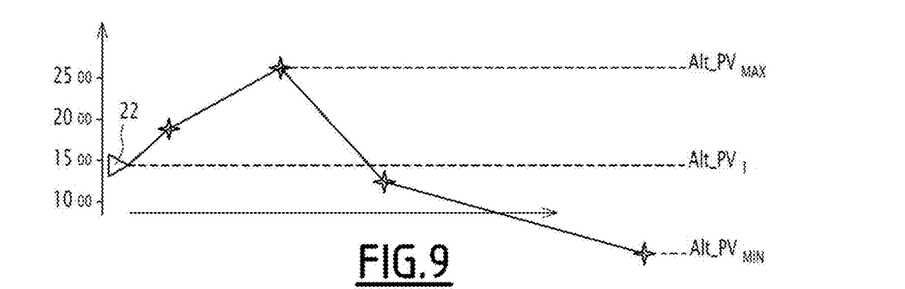
FIG. 9 is a diagram associated with the computation of the reference altitude in flight plan mode, illustrating the case where the first altitude taken into account is that of the aircraft with an altitude of the aircraft next comprised between a maximum altitude and a minimum altitude from among the next points of the flight plan.
Figure 10:
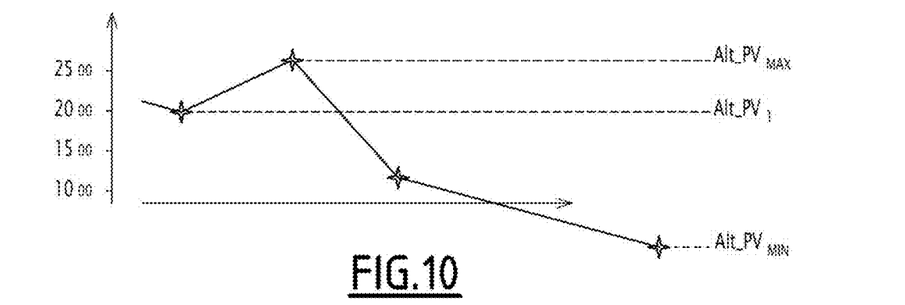
FIG. 10 is a view similar to that of FIG. 9, illustrating the case where the first altitude is a next point of the flight plan further with the depiction of the maximum and minimum altitudes of the aircraft from among the next points of the flight plan.

When the acquired display mode is the flight plan mode, the current altitude $Alt_c$ is the altitude of the next element to be displayed $Alt\_PV_1$ in the range of altitudes from among the altitude of the aircraft 12 (as shown in FIG. 9) and the altitude of the next point of the flight plan (as shown in FIG. 10). In flight plan mode, at least one property $Evol\_Alt_{est}$ relative to the estimated evolution of the altitude of the aircraft 12 depends on an altitude from among a maximum altitude $Alt\_PV_{MAX}$ of the aircraft 12 from among the next points of the flight plan and a minimum altitude $Alt\_PV_{MIN}$ of the aircraft 12 from among the next points of the flight plan.

For the flight plan mode, examples of computation of the reference altitude $Alt_{ref}$ via the first computing module 24 will be described in more detail hereinafter, in light of the diagram 60 of states $E1_{PV}$, $E2_{PV}$, $E3_{PV}$ and $E4_{PV}$ of FIG. 8.

The first determining module 26 is configured to determine the range of altitudes $Alt_{range}$ as a function of the computed reference altitude $Alt_{ref}$.

The altitude interval to be displayed $Alt_{int}$ depends on the position interval to be displayed $Pos_{int}$. The first determining module 26 is for example configured to determine the altitude interval $Alt_{int}$ according to the following equation:

$$Alt_{int} = \min(Alt_{int\_MAX}; AP_{ratio} \cdot Pos_{int}) \quad (1)$$

where $Alt_{int\_MAX}$ represents a predefined maximum value of the altitude interval;

$AP_{ratio}$ represents a predefined ratio of altitude interval relative to the position interval; and $POS_{int}$ represents the position interval.

The predefined maximum value of the altitude interval $Alt_{int\_MAX}$ typically depends on the type of aircraft 12, and is for example equal to 20,000 feet for a helicopter, 30,000 feet for a regional transport airplane, or 40,000 feet for a long haul airplane.

Figure 2:
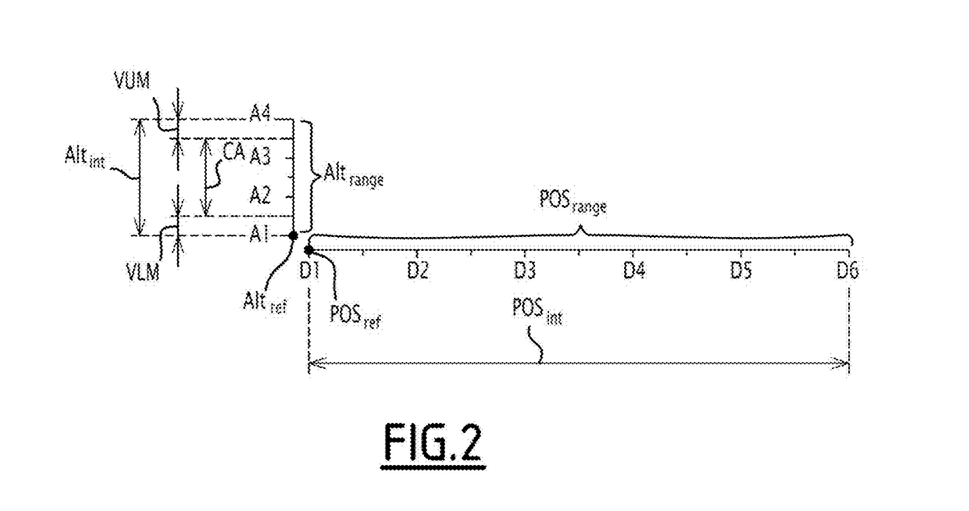
FIG. 2 is a schematic illustration of a range of altitudes associated with a reference altitude, as well as a range of positions associated with a reference position, for the display of the vertical profile by the display system of FIG. 1.
Figure 3:
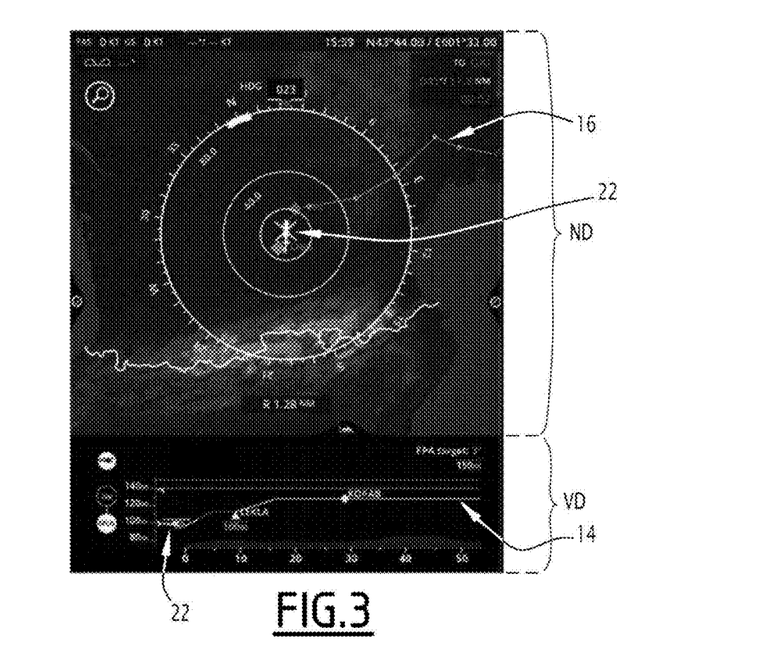
FIG. 3 is a view illustrating the flight profile on the screen of the display system, the display being separated into two separate zones with a first zone for displaying a horizontal flight profile, also called navigation display and denoted ND and a second zone for displaying a vertical flight profile, also called vertical display and denoted VD.

In the example of FIG. 2, when the reference altitude $Alt_{ref}$ corresponds to the minimum value of the range of altitudes $Alt_{range}$, i.e., the low point of the range of altitudes $Alt_{range}$, the first determining module 26 is then configured to determine the range of altitudes $Alt_{range}$ according to the following equation:

$$Alt_{range} = [Alt_{ref}; Alt_{ref} + Alt_{int}] \quad (2)$$

In an alternative that is not shown, when the reference altitude $Alt_{ref}$ corresponds to the maximum value of the range of altitudes $Alt_{range}$, i.e., to the high point of the range of altitudes $Alt_{range}$, the first determining module 26 is then configured to determine the range of altitudes $Alt_{range}$ according to the following equation:

$$Alt_{range} = [Alt_{ref} - Alt_{int}; Alt_{ref}] \quad (3)$$

Also alternatively, when the reference altitude $Alt_{ref}$ corresponds to the median value of the range of altitudes $Alt_{range}$, i.e., to the midpoint of the range of altitudes $Alt_{range}$, the first determining module 26 is then configured to determine the range of altitudes $Alt_{range}$ according to the following equation:

$$Alt_{range} = \left[Alt_{ref} - \frac{Alt_{int}}{2}; Alt_{ref} + \frac{Alt_{int}}{2}\right] \quad (4)$$

When the acquired display mode is the tracking mode and the reference altitude $Alt_{ref}$ is the minimum value of the range of altitudes $Alt_{range}$, the first computing module 24 is for example configured to compute the reference altitude $Alt_{ref}$ according to the following equations:

$$\text{if } \text{Var\_Alt}_{est} \geq \frac{\text{Alt}_{int}}{2} \text{ then } \text{Alt}_{ref} = \text{Alt}_c - \text{Alt}_{int} \times \text{VLM}_{ratio} \quad (5)$$

$$\text{if } \text{Var\_Alt}_{est} \leq -\frac{\text{Alt}_{int}}{2} \text{ then} \quad (6)$$
$$\text{Alt}_{ref} = \text{Alt}_c - \text{Alt}_{int} \times (1 - \text{VUM}_{ratio})$$

$$\text{if } -\frac{\text{Alt}_{int}}{2} < \text{Var\_Alt}_{est} < \frac{\text{Alt}_{int}}{2} \text{ then} \quad (7)$$
$$\text{Alt}_{ref} = \text{Alt}_c + \text{Var\_Alt}_{est} - \frac{\text{Alt}_{int}}{2}$$

where $\text{Var\_Alt}_{est}$ is the estimated altitude variation of the aircraft 12 during the next time interval and from the instantaneous altitude, $\text{Alt}_{int}$ is the altitude interval, $\text{Alt}_c$ is the current altitude, i.e., in tracking mode, the instantaneous altitude of the aircraft 12, $\text{VLM}_{ratio}$ is a ratio of a lower margin VLM of the range of altitudes $\text{Alt}_{range}$, visible in FIG. 2, divided by the altitude interval $\text{Alt}_{int}$, and $\text{VUM}_{ratio}$ is a ratio of an upper margin VUM of the range of altitudes $\text{Alt}_{range}$, visible in FIG. 2, divided by the altitude interval $\text{Alt}_{int}$.

The next time interval is for example a time period of predefined duration computed from the considered moment in time, i.e., the moment where the user interacts with the management device 20. The predefined duration is for example equal to 1 minute.

Figure 6:
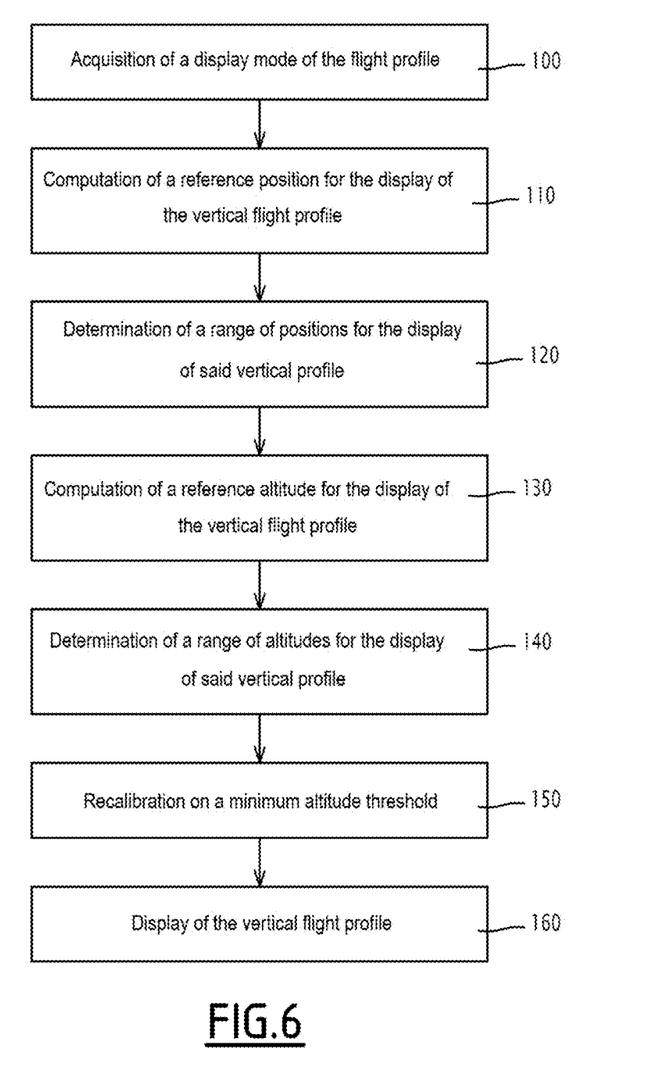
FIG. 6 is a flowchart of a method, according to the invention, for managing the display of the flight profile of the aircraft.

In the example of FIG. 6, the lower margin VLM represents one sixth of the altitude interval $\text{Alt}_{int}$, and $\text{VLM}_{ratio}=\frac{1}{6}$. The upper margin VUM also represents one sixth of the altitude interval $\text{Alt}_{int}$, and $\text{VUM}_{ratio}=\frac{1}{6}$.

Figure 7:
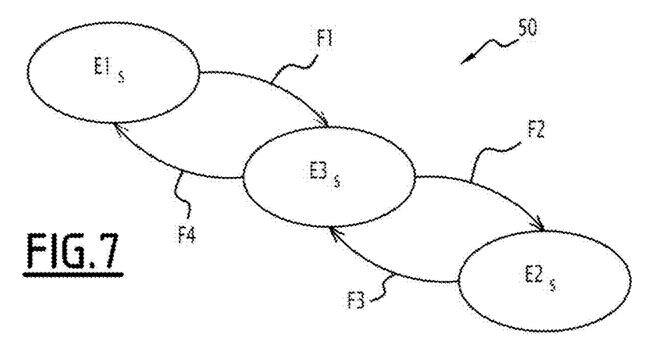
FIG. 7 is a states diagram illustrating the computation of the reference altitude for the display of the vertical flight profile when the selected display mode is the tracking mode.

Equation (5) above corresponds to a first state $E1_S$ in tracking mode, visible in FIG. 7, in which the symbol 22 depicting the aircraft must be displayed in the lower part of the altitude range $\text{Alt}_{range}$, anticipating a significant upward altitude variation during the next time interval. In the example of equation (5), the impending upward altitude variation is considered to be significant if it represents more than half of the altitude interval $\text{Alt}_{int}$.

Equation (6) above corresponds to a second state $E2_S$ in tracking mode, in which the symbol 22 depicting the aircraft must be displayed in the upper part of the altitude range $\text{Alt}_{range}$, anticipating a significant downward altitude variation during the next time interval. In the example of equation (6), the impending downward altitude variation is considered to be significant if it represents, in absolute value, more than half of the altitude interval $\text{Alt}_{int}$.

Equation (7) above corresponds to a third state $E3_S$ in tracking mode, in which the symbol 22 depicting the aircraft must be displayed in a central zone of the altitude range $\text{Alt}_{range}$, anticipating a relatively small altitude variation during the next time interval. In the example of equation (7), the impending altitude variation is considered to be relatively small if it represents, in absolute value, less than half of the altitude interval $\text{Alt}_{int}$.

When the acquired display mode is the tracking mode and alternatively the reference altitude $\text{Alt}_{ref}$ is the maximum value or the median value of the range of altitudes $\text{Alt}_{range}$, the computation of the reference altitude $\text{Alt}_{ref}$ is deduced simply from equations (5) to (7) by analogy.

When the acquired display mode is the flight plan mode and the reference altitude $\text{Alt}_{ref}$ is the minimum value of the range of altitudes $\text{Alt}_{range}$, the first computing module 24 is for example configured to compute the reference altitude $\text{Alt}_{ref}$ according to the following equations:

$$\text{if } (\text{Alt\_PV}_{MAX}-\text{Alt}_{int}\cdot\text{CA}_{ratio})\geq\text{Alt}_c \text{ then } \text{Alt}_{ref}=\text{Alt}_c-\text{Alt}_{int}\times\text{VLM}_{ratio} \quad (8)$$

$$\begin{aligned}&\text{if } (\text{Alt\_PV}_{MAX}-\text{Alt}_{int}\cdot\text{CA}_{ratio})<\text{Alt}_c \text{ and } \text{Alt\_PV}_{MAX}\\&\geq\text{Alt}_c \text{ and } (\text{Alt\_PV}_{MAX}-\text{Alt\_PV}_{MIN})\\&\geq\text{Alt}_{int}\cdot\text{CA}_{ratio} \text{ then } \text{Alt}_{ref}=\text{Alt\_PV}_{MAX}-\text{Alt}_{int}\times\\&(1-\text{VUM}_{ratio})\end{aligned} \quad (9)$$

$$\begin{aligned}&\text{if } (\text{Alt\_PV}_{MAX}-\text{Alt}_{int}\cdot\text{CA}_{ratio})<\text{Alt}_c \text{ and}\\&\{\text{Alt\_PV}_{MAX}<\text{Alt}_c \text{ or } (\text{Alt\_PV}_{MAX}-\text{Alt\_PV}_{MIN})\\&<\text{Alt}_{int}\cdot\text{CA}_{ratio}\} \text{ and } (\text{Alt\_PV}_{MIN}+\text{Alt}_{int}\cdot\text{CA}_{ratio})\\&\geq\text{Alt}_c \text{ then } \text{Alt}_{ref}=\text{Alt}_c-\text{Alt}_{int}\times(1-\text{VUM}_{ratio})\end{aligned} \quad (10)$$

$$\begin{aligned}&\text{if } (\text{Alt\_PV}_{MAX}-\text{Alt}_{int}\cdot\text{CA}_{ratio})<\text{Alt}_c \text{ and}\\&\{\text{Alt\_PV}_{MAX}<\text{Alt}_c \text{ or } (\text{Alt\_PV}_{MAX}-\text{Alt\_PV}_{MIN})\\&<\text{Alt}_{int}\cdot\text{CA}_{ratio}\} \text{ and } (\text{Alt\_PV}_{MIN}+\text{Alt}_{int}\cdot\text{CA}_{ratio})\\&\geq\text{Alt}_c \text{ then } \text{Alt}_{ref}=\text{Alt\_PV}_{MIN}-\text{Alt}_{int}\times\text{VLM}_{ratio}\end{aligned} \quad (11)$$

where $\text{Alt\_PV}_{MAX}$ is the maximum altitude of the aircraft 12 from among the next points of the flight plan, $\text{Alt\_PV}_{MIN}$ is the minimum altitude of the aircraft 12 from among the next points of the flight plan, $\text{Alt}_{int}$ is the altitude interval, $\text{Alt}_c=\text{Alt\_PV}_1$ is the current altitude in flight plan mode, i.e., the altitude $\text{Alt\_PV}_1$ of the next element to be displayed from among the altitude of the aircraft 12 and the altitude of the next point of the flight plan, $\text{CA}_{ratio}$ is the ratio of a central zone CA of the range of altitudes $\text{Alt}_{range}$, visible in FIG. 2, divided by the altitude interval $\text{Alt}_{int}$, $\text{VLM}_{ratio}$ is the ratio of the lower margin VLM divided by the altitude interval $\text{Alt}_{int}$, and $\text{VUM}_{ratio}$ is the ratio of the upper margin VUM divided by the altitude interval $\text{Alt}_{int}$.

In the example of FIG. 6, the central zone CA represents two thirds of the altitude interval $\text{Alt}_{int}$, and $\text{CA}_{ratio}=\frac{4}{6}=\frac{2}{3}$.

Figure 8:
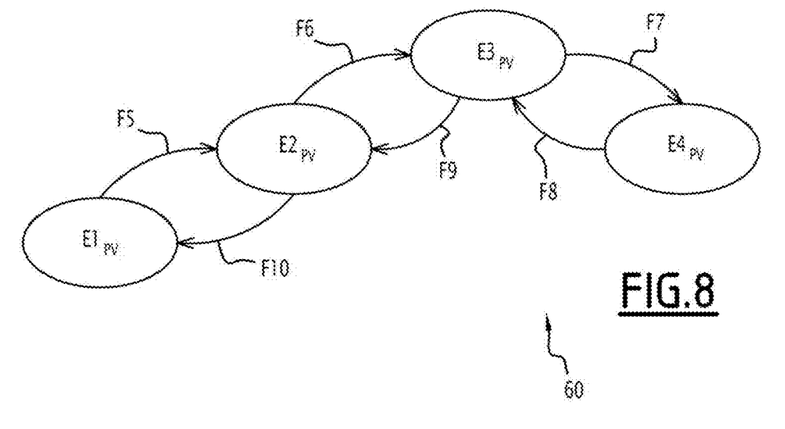
FIG. 8 is a view similar to that of FIG. 7 when the selected display mode is the flight plan mode.
Figure 11:
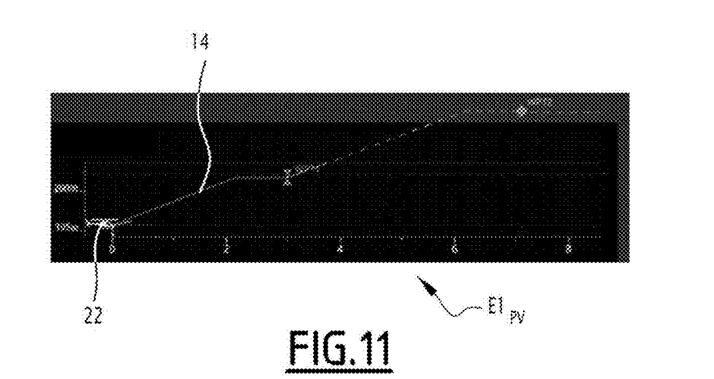
FIG. 11 is a schematic view of the vertical flight profile in flight plan mode, illustrating a first state of the diagram of FIG. 8.

Equation (8) above corresponds to a first state $E1_{PV}$ in flight plan mode, visible in FIG. 8, in which a symbol depicting the next element to be displayed among the aircraft 12 (case of FIG. 9) and the next point of the flight plan (case of FIG. 10) must be displayed in the bottom part of the range of altitudes $\text{Alt}_{range}$, in anticipation of a future upward altitude variation, as shown in FIG. 11.

Figure 12:
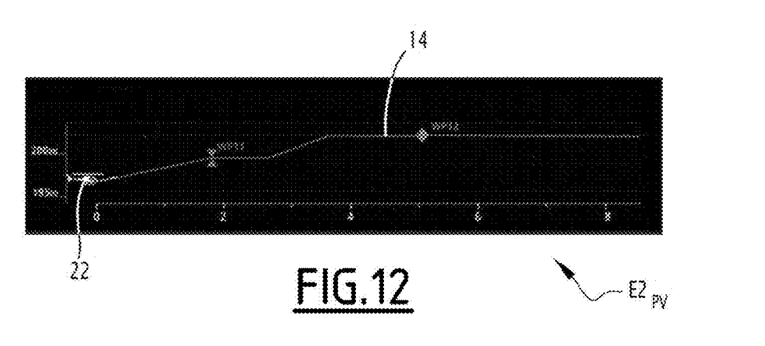
FIG. 12 is a view similar to that of FIG. 11, illustrating a second state of the diagram of FIG. 8.

Equation (9) above corresponds to a second state $E2_{PV}$ in flight plan mode, in which the symbol depicting the next element to be displayed among the aircraft 12 and the next point of the flight plan must be displayed in the central zone of the range of altitudes $\text{Alt}_{range}$, during a climb in anticipation of an approach to the highest point, as shown in FIG. 12.

Figure 13:
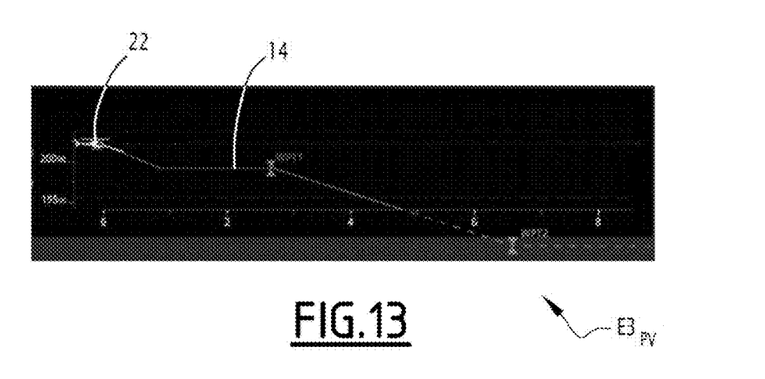
FIG. 13 is a view similar to that of FIG. 11, illustrating a third state of the diagram of FIG. 8.

Equation (10) above corresponds to a third state $E3_{PV}$ in flight plan mode, in which the symbol depicting the next element to be displayed among the aircraft 12 and the next point of the flight plan must be displayed in the upper part of the range of altitudes $\text{Alt}_{range}$, in anticipation of an impending downward altitude variation, as shown in FIG. 13.

Figure 14:
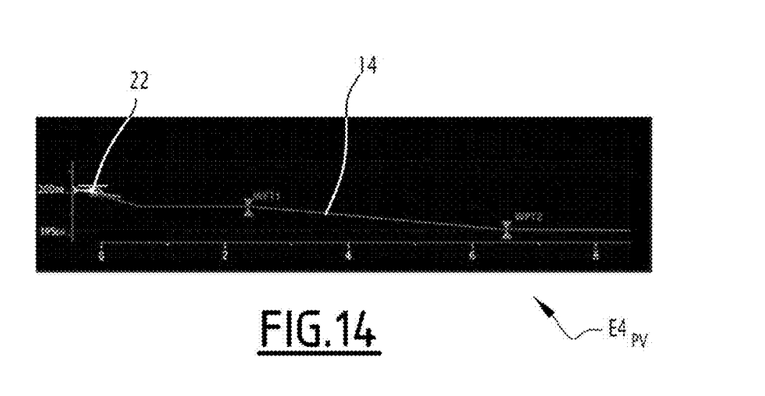
FIG. 14 is a view similar to that of FIG. 11, illustrating a fourth and final state of the diagram of FIG. 8.

Equation (11) above corresponds to a fourth state $E4_{PV}$ in flight plan mode, in which the symbol depicting the next element to be displayed among the aircraft 12 and the next point of the flight plan must be displayed in the central zone of the range of altitudes $\text{Alt}_{range}$, during a descent, as shown in FIG. 14.

When the acquired display mode is the flight plan mode and alternatively the reference altitude $\text{Alt}_{ref}$ is the maximum value or the median value of the range of altitudes $\text{Alt}_{range}$, the computation of the reference altitude $Alt_{ref}$ is deduced simply from equations (8) to (11) by analogy.

As an optional addition, the first computing module 24 is configured to recalibrate the computed reference altitude $Alt_{ref}$ relative to a minimum altitude threshold $Alt_{MIN}$. The purpose of this is to avoid displaying, on the vertical display VD, absurd altitude zones for the aircraft 12, such as underground zones.

Given that some airports have negative altitudes, it is preferable to choose a negative value for the minimum altitude threshold $Alt_{MIN}$, for example −1,500 feet.

The first computing module 24 is for example configured to recalibrate the reference altitude $Alt_{ref}$ according to the following equation:

$$\text{if } Alt_{ref} < Alt_{MIN} \text{ then } Alt_{ref} := Alt_{MIN} \qquad (12)$$

The second computing module 28 is configured to compute the reference position $Pos_{ref}$ to display the vertical profile 14, as a function of the current position $Pos_c$ of the aircraft 12.

When the acquired display mode is the tracking mode, the current position $Pos_c$ is an instantaneous position of the aircraft 12. In tracking mode, the reference position $Pos_{ref}$ is then the current position $Pos_c$ of the aircraft 12.

When the acquired display mode is the flight plan mode, the current position $Pos_c$ is the position of the next element to be displayed among the aircraft 12 and the next point of the flight plan. In flight plan mode, the reference position $Pos_{ref}$ is for example a projection of said current position $Pos_c$ on the lateral trajectory of the aircraft 12, provided in flight plan mode.

One skilled in the art will further understand that the position of the aircraft 12 in the flight plan is the position in which the aircraft 12 is found within the flight plan, in light of any interaction by the user. Indeed, when the user interacts with the management device 20 in flight plan mode, he has the possibility of viewing the next points of a predicted trajectory of the aircraft 12 along the flight plan, and therefore varying the current position $Pos_c$ along the predicted flight plan.

One skilled in the art will then observe that the current position $Pos_c$ in flight plan mode does not necessarily correspond to the instantaneous position of the aircraft 12. Instantaneous position refers to the position of the aircraft 12 measured at the moment in time, i.e., the moment where the user interacts with the management device 20.

The second determining module 30 is configured to compute the range of positions $Pos_{range}$ for the display of said vertical profile 14, as a function of the computed reference position $Pos_{ref}$ and the position interval $Pos_{int}$.

In the example of FIG. 2, when the reference position $Pos_{ref}$ corresponds to the minimum value of the range of positions $Pos_{range}$, i.e., the proximal point of the range of positions $Pos_{range}$, the second determining module 30 is then configured to determine the range of positions $Pos_{range}$ according to the following equation:

$$Pos_{range} = [Pos_{ref}; Pos_{ref} + Pos_{int}] \qquad (13)$$

In an alternative that is not shown, when the reference position $Pos_{ref}$ corresponds to the maximum value of the range of positions $Pos_{range}$, i.e., the distal point of the range of positions $Pos_{range}$, the second determining module 30 is then configured to determine the range of positions $Pos_{range}$ according to the following equation:

$$Pos_{range} = [Pos_{ref} - Pos_{int}; Pos_{ref}] \qquad (14)$$

Also alternatively, when the reference position $Pos_{ref}$ corresponds to the median value of the range of positions $Pos_{range}$, i.e., the midpoint of the range of positions $Pos_{range}$, the second determining module 30 is then configured to determine the range of positions $Pos_{range}$ according to the following equation:

$$Pos_{range} = \left[ Pos_{ref} - \frac{Pos_{int}}{2}; Pos_{ref} + \frac{Pos_{int}}{2} \right] \qquad (15)$$

The operation of the electronic management device 20 will now be explained using FIG. 6, showing a flowchart of the method, according to the invention, for managing the display of a flight profile 14, 16 of the aircraft 12, in particular the vertical flight profile 14, the method being implemented by the management device 20.

During an initial step 100, the management device 20 acquires, via its acquisition module 32, the selected display mode of the flight profile from among the tracking mode and the flight plan mode.

The display mode is for example able to be selected by the pilot via a corresponding control member, as a function of his current task. The pilot will for example use the flight plan mode during a navigation phase, and the tracking mode when he is guided by air traffic control.

The display mode can also be selected automatically by an associated avionic system, based on predefined criteria. An automatic transition from the flight plan mode to the tracking mode will for example be done when the aircraft 12 deviates from the flight plan, and conversely an automatic transition from the tracking mode to the flight plan mode will occur when the aircraft 12 approaches the flight plan.

The display mode selected from among the tracking mode and the flight plan mode will have a direct impact on the display capabilities offered by the vertical display VD and on the depiction of the graphic elements around the symbol 22 of the aircraft, as shown in FIGS. 4 and 5, respectively illustrating the tracking mode and the flight plan mode.

The electronic management device 20 next computes, during step 110 and via its second computing module 28, the reference position $Pos_{ref}$ as a function of the current position $Pos_c$ of the aircraft 12 and, as previously indicated, depending on whether the display mode is the tracking mode or the flight plan mode.

In tracking mode, the reference position $Pos_{ref}$ is then the current position $Pos_c$ of the aircraft 12. In flight plan mode, the reference position $Pos_{ref}$ is for example the projection of the current position $Pos_c$ on the lateral trajectory of the aircraft 12.

During the following step 120, the management device 20 determines, via its second determining module 30, the range of positions $Pos_{range}$ for the display of said vertical profile 14, the range of positions $Pos_{range}$ being determined as a function of the computed reference position $Pos_{ref}$ and the position interval $Pos_{int}$, for example according to one of equations (13) to (15).

One skilled in the art will note that the value of the position interval $Pos_{int}$ to be displayed can be modified by the user, in particular continuously between predefined minimum and maximum values.

This change to the value of the position interval $Pos_{int}$ is for example controlled via a tactile gesture by the user on a touch-sensitive surface connected to the electronic management device 20, or via a knob or coil turret connected to the management device 20. The tactile gesture is typically a separation gesture, respectively a pinching gesture, by two of the user's fingers, in order to increase, respectively decrease, the value of the position interval $Pos_{int}$.

As an optional addition, the predefined minimum and maximum values of the position interval $Pos_{int}$ depend on the selected display mode from among the tracking mode and the flight plan mode. The maximum value of the position interval $Pos_{int}$ associated with the tracking mode is then generally lower than that associated with the flight plan mode.

Also as a further optional addition, the predefined minimum and maximum values of the position interval $Pos_{int}$ depend on the type of aircraft 12. The predefined minimum and maximum values of the position interval $Pos_{int}$ associated with a helicopter are for example lower than those associated with a regional transport airplane or a long-haul airplane.

Also as an optional addition, the value of the position interval $Pos_{int}$ used for the vertical display VD, is correlated, on action by the user, with that used for the navigation display ND.

The management device 20 computes, during step 130 and via its first computing module 24, the reference altitude $Alt_{ref}$ as a function of the current altitude $Alt_c$, the altitude interval $Alt_{int}$ and at least one property $Evol\_Alt_{ref}$ relative to the estimated evolution of the altitude of the aircraft 12 from said current altitude $Alt_c$.

When the acquired display mode is the tracking mode, the first computing module 24 computes the reference altitude $Alt_{ref}$ for example using the previous equations (5) to (7), respectively corresponding to the first, second and third states $E1_S$, $E2_S$ and $E3_S$ in tracking mode, visible in FIG. 7.

The first state $E1_S$ in tracking mode is the state in which the symbol 22 depicting the aircraft is displayed in the lower part of the altitude range $Alt_{range}$, anticipating a significant upward altitude variation. The second state $E2_S$ is that where the symbol 22 is displayed in the upper part of the altitude range $Alt_{range}$, in anticipation of a significant downward altitude variation, and the third state $E3_S$ is that in which the symbol 22 is displayed in the central zone of the altitude range $Alt_{range}$, in anticipation of a relatively small altitude variation of the aircraft 12.

In FIG. 7, the state diagram illustrates the changes of state between the first, second and third states $E1_S$, $E2_S$ and $E3_S$ in tracking mode. The transition from the first state $E1_S$ to the third state $E3_S$, depicted by the arrow F1, occurs in case of decrease in the upward altitude variation and/or increase in the altitude interval $Alt_{int}$. The transition from the third state $E3_S$ to the second state $E2_S$, depicted by the arrow F2, occurs in case of increase in the downward altitude variation and/or decrease in the altitude interval $Alt_{int}$. Conversely, the transition from the second state $E2_S$ to the third state $E3_S$, depicted by the arrow F3, occurs in case of decrease in the downward altitude variation and/or increase in the altitude interval $Alt_{int}$. Lastly, the transition from the third state $E3_S$ to the first state $E1_S$, depicted by the arrow F4, occurs in case of increase in the upward altitude variation and/or decrease in the altitude interval $Alt_{int}$.

During step 130, when the acquired display mode is the flight plan mode, the first computing module 24 computes the reference altitude $Alt_{ref}$ for example using the previous equations (8) to (11), respectively corresponding to the first, second, third and fourth states $E1_{PV}$, $E2_{PV}$, $E3_{PV}$ and $E4_{PV}$ in flight plan mode, visible in FIG. 8.

The first state $E1_{PV}$ in flight plan mode is the state in which the symbol for the next element among the aircraft 12 and the next point of the flight plan is displayed in the lower part of the range of altitudes $Alt_{range}$, in anticipation of an impending upward altitude variation, as shown in FIG. 11. The second state $E2_{PV}$, illustrated in FIG. 12, is that where the symbol for the next element is displayed in the central zone of the altitude range $Alt_{range}$, during an anticipated climb for an approach to the highest point. The third state $E3_{PV}$, illustrated in FIG. 13, is that in which the symbol for the next element is displayed in the upper part of the altitude range $Alt_{range}$, in anticipation of an impending downward variation, and the fourth state $E4_{PV}$ is that where the symbol for the next element is displayed in the central zone of the altitude range $Alt_{range}$, during an anticipated descent for an approach to the lowest point, as shown in FIG. 14.

According to FIG. 8, the state diagram illustrates the changes in states between the first, second, third and fourth states $E1_{PV}$, $E2_{PV}$, $E3_{PV}$ and $E4_{PV}$ in flight plan mode. The transition from the first state $E1_{PV}$ to the second state $E2_{PV}$, shown by the arrow F5, occurs in case of approach to the altitude $Alt\_PV_1$, of the highest point of the range of altitudes being displayed and/or increase of the altitude interval $Alt_{int}$. The transition from the second state $E2_{PV}$ to the third state $E3_{PV}$, shown by the arrow F6, occurs when the altitude $Alt\_PV_1$ is higher than the highest point of the range of altitudes being displayed. The transition from the third state $E3_{PV}$ to the fourth state $E4_{PV}$, shown by the arrow F7, occurs in case of approach to the altitude $Alt\_PV_1$ of the lowest point of the range of altitudes being displayed and/or increase of the altitude interval $Alt_{int}$. Conversely, the transition from the fourth state $E4_{PV}$ to the third state $E3_{PV}$, shown by the arrow F8, occurs in case of separation from the altitude $Alt\_PV_1$ of the lowest point of the range of altitudes being displayed and/or decrease of the altitude interval $Alt_{int}$. The transition from the third state $E3_{PV}$ to the second state $E2_{PV}$, shown by the arrow F9, occurs when the altitude $Alt\_PV_1$ is lower than the highest point of the range of altitudes being displayed. Lastly, the transition from the second state $E2_{PV}$ to the first state $E1_{PV}$, shown by the arrow F10, occurs in case of separation from the altitude $Alt\_PV_1$ of the highest point of the range of altitudes being displayed and/or decrease of the altitude interval $Alt_{int}$.

During the following step 140, the management device 20 determines, via its first determining module 26, the range of altitudes $Alt_{range}$ as a function of the computed reference altitude $Alt_{ref}$ and the altitude interval $Alt_{int}$, for example according to one of equations (2) to (4).

The determination of the altitude interval $Alt_{int}$ is preferably done identically irrespective of the selected display mode.

The altitude interval $Alt_{int}$ is typically proportional to the position interval $Pos_{int}$. As a result, like for the position interval $Pos_{int}$, the altitude interval $Alt_{int}$ can be modified by the user, in particular continuously.

The factor $AP_{ratio}$ is for example applied to the position interval $Pos_{int}$ to compute the altitude interval $Alt_{int}$. This factor $AP_{ratio}$ is chosen as a function of the size of the vertical display VD on the screen 18 (numbers of pixels in X and Y) and the necessary precision in altitude for the aircraft 12 on which the vertical display VD is broken down. The required precision for a helicopter is potentially different from that required for an airplane. This makes it possible to keep a constant display of the gradients of the vertical trajectory on the screen 18. One skilled in the art will note that the gradients displayed are generally not the actual geometric gradients, but that for a given geometric gradient, the depiction is constant. As an example, a trajectory with an actual geometric gradient of 3° is always shown with a gradient equal to 25° on the screen 18.

In tracking mode or in flight plan mode, the altitude interval $Alt_{int}$ is for example determined according to the preceding equation (1).

The minimum possible value of the altitude interval $Alt_{int}$ is preferably proportional to that of the position interval $Pos_{int}$.

The maximum possible value $Alt_{int\_MAX}$ of the altitude interval $Alt_{int}$ is preferably independent of that of the position interval $Pos_{int}$. This maximum possible value $Alt_{int\_MAX}$ is for example predefined. It typically depends on the type of aircraft 12, as previously described. Such a maximum value $Alt_{int\_MAX}$ of the altitude interval $Alt_{int}$ then allows a permanent display of the relevant information for the aircraft 12 on which the vertical display VD is broken down. The trade-off is that once the maximum value $Alt_{int\_MAX}$ of the altitude interval $Alt_{int}$ is reached, the gradients visible on the screen 18 are not kept. This does not, however, cause any drawback for the user, since when he chooses a high value (close to the maximum value $Alt_{int\_MAX}$) for the altitude interval $Alt_{int}$, he seeks an essentially schematic depiction on the vertical display VD.

As an optional addition, during step 150, the management device 20 recalibrates, if applicable and via its first computing module 24, the computed reference altitude $Alt_{ref}$ relative to the minimum altitude threshold $Alt_{MIN}$. This recalibration of the reference altitude $Alt_{ref}$ is for example done according to equation (12).

The management device 20 lastly commands, during step 160 and via its display module 34, the display of the flight profile 14, 16 of the aircraft 12, in particular the vertical flight profile 14, particularly as a function of the ranges of positions $Pos_{range}$ and altitudes $Alt_{range}$ previously determined during steps 120 and 140.

The aforementioned steps of the display management method are reiterated regularly, in particular so as to regularly adapt the ranges of positions $Pos_{range}$ and altitudes $Alt_{range}$ as a function of the evolutions in the current position $Pos_c$ and current altitude $Alt_c$ of the aircraft 12.

Thus, the display management method according to the invention makes it possible to adapt the displayed range of altitudes $Alt_{range}$ of the vertical profile 14, in particular the reference altitude $Alt_{ref}$ taken into account to determine said range of altitudes $Alt_{range}$, as a function of the estimated evolution of the altitude of the aircraft from the current altitude $Alt_c$ taken into account.

The method and the management device 20 then offer better continuity during the movement of elements and/or the variation of gradients, displayed on the screen 18 during the flight or after an action by the user, such as the pilot. This in particular makes it possible to improve the current and future understanding of the situation by the user. They in particular limit position jumps on the vertical display VD.

They also allow better matching of the displayed information as a function of the current task, for example takeoff/cruising/descent in tracking mode or preparation for the flight in flight plan mode, and allow better perception and understanding of the information by the user, for more effective decision-making.

The method and the management device 20 also allow a reduction in the workload and time allocated to perform the task of developing the vertical display VD, the user interacting preferably only with the horizontal scale, through simple and fast actions.

One can then see that the method and the management device 20 for displaying a flight profile 14, 16 of the aircraft 12 make it possible to offer better readability of the displayed flight profile 14, 16, in particular of the vertical flight profile 14.

As previously indicated, when the acquired display mode is the tracking mode and the reference altitude $Alt_{ref}$ is the minimum value of the range of altitudes $Alt_{range}$, the first computing module 24 is for example configured to compute the reference altitude $Alt_{ref}$ according to the preceding equations (5) to (7).

As previously indicated, when the acquired display mode is the tracking mode and alternatively the reference altitude $Alt_{ref}$ is the maximum value or the median value of the range of altitudes $Alt_{range}$, the computation of the reference altitude $Alt_{ref}$ is deduced simply from equations (5) to (7) by analogy.

Thus, when the acquired display mode is the tracking mode and the reference altitude $Alt_{ref}$ is the maximum value of the range of altitudes $Alt_{range}$, the first computing module 24 is for example configured to compute the reference altitude $Alt_{ref}$ according to the following equations:

$$\text{if } Var\_Alt_{est} \geq \frac{Alt_{int}}{2} \text{ then} \quad (16)$$
$$Alt_{ref} = Alt_c + Alt_{int} \times (1 - VLM_{ratio})$$

$$\text{if } Var\_Alt_{est} \leq -\frac{Alt_{int}}{2} \text{ then} \quad (17)$$
$$Alt_{ref} = Alt_c + Alt_{int} \times VUM_{ratio}$$

$$\text{if } -\frac{Alt_{int}}{2} < Var\_Alt_{est} < \frac{Alt_{int}}{2} \text{ then} \quad (18)$$
$$Alt_{ref} = Alt_c + Var\_Alt_{est} + \frac{Alt_{int}}{2}$$

where $Var\_Alt_{est}$, $Alt_{int}$, $Alt_c$, $VLM_{ratio}$, and $VUM_{ratio}$ represent the same properties, or variables, as for equations (5) to (7).

Equations (16) to (18) follow from equations (5) to (7), each time adding $Alt_{int}$ to them, since $Alt_{int}$ by definition corresponds to the difference between the minimum value—corresponding to the reference altitude $Alt_{ref}$ for equations (5) and (7)—and the maximum value—corresponding to the reference altitude $Alt_{ref}$ for equations (16) to (18)—of the range of altitudes $Alt_{range}$.

Likewise, when the acquired display mode is the tracking mode and the reference altitude $Alt_{ref}$ is the median value of the range of altitudes $Alt_{range}$, the first computing module 24 is for example configured to compute the reference altitude $Alt_{ref}$ according to the following equations:

$$\text{if } Var\_Alt_{est} \geq \frac{Alt_{int}}{2} \text{ then} \quad (19)$$
$$Alt_{ref} = Alt_c + Alt_{int} \times \left(\frac{1}{2} - VLM_{ratio}\right)$$

$$\text{if } Var\_Alt_{est} \leq -\frac{Alt_{int}}{2} \text{ then} \quad (20)$$
$$Alt_{ref} = Alt_c + Alt_{int} \times \left(VUM_{ratio} - \frac{1}{2}\right)$$

$$\text{if } -\frac{Alt_{int}}{2} < Var\_Alt_{est} < \frac{Alt_{int}}{2} \text{ then} \quad (21)$$
$$Alt_{ref} = Alt_c + Var\_Alt_{est}$$

where $Var\_Alt_{est}$, $Alt_{int}$, $Alt_c$, $VLM_{ratio}$, and $VUM_{ratio}$ represent the same properties, or variables, as for equations (5) to (7).

Equations (19) to (21) follow from equations (5) to (7), each time adding $Alt_{int}/2$ to them, since $Alt_{int}/2$ corresponds to the difference between the minimum value—corresponding to the reference altitude $Alt_{ref}$ for equations (5) and (7)—and the median value—corresponding to the reference altitude $Alt_{ref}$ for equations (19) to (21)—of the range of altitudes $Alt_{range}$. As a corollary, equations (19) to (21) follow from equations (16) to (18) by subtracting $Alt_{int}/2$ from them each time.

As previously indicated, the property $Evol\_Alt_{est}$ relative to the estimated evolution of the altitude of the aircraft 12 is for example the estimated altitude variation $Var\_Alt_{est}$ of the aircraft 12 during a next time interval and from the instantaneous altitude. One skilled in the art will then understand that this estimated variation in altitude $Var\_Alt_{est}$ is for example determined by computing an average vertical speed of the aircraft 12 during a predefined duration, then multiplying said average vertical speed by said predefined duration to obtain the estimated altitude variation $Var\_Alt_{est}$. The predefined duration is for example between 5 seconds and 20 seconds, preferably between 8 seconds and 15 seconds, still more preferably substantially equal to 10 seconds. The average vertical speed of the aircraft 12 is typically computed by sampling, and is then equal to the sum of the vertical speeds sampled during the predefined duration, divided by the number of samples during said predefined duration.

Furthermore, one skilled in the art will note that when the property $Evol\_Alt_{est}$ is the estimated altitude variation $Var\_Alt_{est}$ of the aircraft 12 during an upcoming time interval, rather than an average value of the altitude of the upcoming segment of the flight trajectory, this makes it possible to be able to determine the range of altitudes $Alt_{range}$ for display of the said vertical profile 14, even without flight trajectory or in case of unavailability of the vertical flight trajectory, such unavailability for example resulting from a failure of the flight management system or FMS, an absence of entry of the flight plan by the pilot, or a visual flight phase. This also has the advantage of being able to determine the range of altitudes $Alt_{range}$ for the display of said vertical profile 14, including when the latter does not follow the flight trajectory.

One skilled in the art will also note that when the property $Evol\_Alt_{est}$ is the maximum or minimum altitude of the aircraft among the next points of the flight plan, rather than the average value of the altitude of the upcoming segment of the flight trajectory, this makes it possible to offer a better continuity in the display of the vertical flight profile 14 and the symbol 22 depicting the aircraft 12, which then do not abruptly change position on the screen.

The invention claimed is:

1. A method for managing the display of a flight profile of an aircraft, the method being implemented by an electronic display management device and comprising the following steps:
   computing a reference altitude for the display of a vertical flight profile,
   determining a range of altitudes for the display of said vertical profile, the range of altitudes being determined as a function of the computed reference altitude,
   wherein the reference altitude is computed as a function of a current altitude, an altitude interval to be displayed and at least one property relative to an estimated evolution of the altitude of the aircraft from said current altitude, and
   wherein at least one property relative to an estimated evolution of the altitude of the aircraft is chosen from among the group consisting of: an estimated altitude variation of the aircraft during a next time interval and from the current altitude, a maximum altitude of the aircraft from among the next points of a flight plan and a minimum altitude of the aircraft from among the next points of the flight plan.

2. The method according to claim 1, wherein the method further comprises a step for acquiring a selected display mode of the flight profile from among a tracking mode and a flight plan mode, and
   wherein when the acquired display mode is the tracking mode, the current altitude is an instantaneous altitude of the aircraft and the property relative to the estimated evolution of the altitude of the aircraft is the estimated altitude variation of the aircraft during the next time interval and from the instantaneous altitude.

3. The method according to claim 1, wherein the current altitude is an instantaneous altitude of the aircraft and the property relative to the estimated evolution of the altitude of the aircraft is the estimated altitude variation of the aircraft during the next time interval and from the instantaneous altitude, and
   wherein if said estimated altitude variation is, in absolute value, less than half of the altitude interval, then the reference altitude depends on the sum of the current altitude and said estimated altitude variation, and
   if said estimated altitude variation is, in absolute value, greater than or equal to half of the altitude interval, then the reference altitude depends on the sum of the current altitude and a lower margin or upper margin of the range of altitudes.

4. The method according to claim 3, wherein
   if the reference altitude is the minimum value of the range of altitudes, the reference altitude verifies the following equations:

$$\text{if } Var\_Alt_{est} \geq \frac{Alt_{int}}{2} \text{ then } Alt_{ref} = Alt_c - Alt_{int} \times VLM_{ratio}$$

$$\text{if } Var\_Alt_{est} \leq -\frac{Alt_{int}}{2} \text{ then } Alt_{ref} = Alt_c - Alt_{int} \times (1 - VUM_{ratio})$$

$$\text{if } -\frac{Alt_{int}}{2} < Var\_Alt_{est} < \frac{Alt_{int}}{2} \text{ then}$$

$$Alt_{ref} = Alt_c + Var\_Alt_{est} - \frac{Alt_{int}}{2}$$

if the reference altitude is the maximum value of the range of altitudes, the reference altitude verifies the following equations:

$$\text{if } Var\_Alt_{est} \geq \frac{Alt_{int}}{2} \text{ then } Alt_{ref} = Alt_c + Alt_{int} \times (1 - VLM_{ratio})$$

$$\text{if } Var\_Alt_{est} \leq -\frac{Alt_{int}}{2} \text{ then } Alt_{ref} = Alt_c + Alt_{int} \times VUM_{ratio}$$

$$\text{if } -\frac{Alt_{int}}{2} < Var\_Alt_{est} < \frac{Alt_{int}}{2} \text{ then}$$

$$Alt_{ref} = Alt_c + Var\_Alt_{est} + \frac{Alt_{int}}{2}$$

if the reference altitude is the median value of the range of altitudes, the reference altitude verifies the following equations:

$$\text{if Var\_Alt}_{est} \geq \frac{Alt_{int}}{2} \text{ then } Alt_{ref} = Alt_c + Alt_{int} \times \left(\frac{1}{2} - VLM_{ratio}\right)$$

$$\text{if Var\_Alt}_{est} \leq -\frac{Alt_{int}}{2} \text{ then } Alt_{ref} = Alt_c + Alt_{int} \times \left(VUM_{ratio} - \frac{1}{2}\right)$$

$$\text{if } -\frac{Alt_{int}}{2} < \text{Var\_Alt}_{est} < \frac{Alt_{int}}{2} \text{ then } Alt_{ref} = Alt_c + \text{Var\_Alt}_{est}$$

where $\text{Var\_Alt}_{est}$ is the estimated altitude variation of the aircraft during the next time interval and from the instantaneous altitude, $Alt_{int}$ is the altitude interval, $Alt_c$ is the current altitude, $VLM_{ratio}$ is a ratio of a lower margin of the range of altitudes divided by the altitude interval, and $VUM_{ratio}$ is a ratio of an upper margin of the range of altitudes divided by the altitude interval.

5. The method according to claim 1, wherein the method further comprises a step for acquiring a selected display mode of the flight profile from among a tracking mode and a flight plan mode, and wherein when the acquired display mode is the flight plan mode, the current altitude is the altitude of the next element to be displayed in the range of altitudes from among the altitude of the aircraft and the altitude of the next point of the flight plan, and at least one property relative to the estimated evolution of the altitude of the aircraft depends on an altitude from among the maximum altitude of the aircraft from among the next points of the flight plan and the minimum altitude of the aircraft from among the next points of the flight plan.

6. The method according to claim 1, wherein the method further comprises the following steps:

computing a reference position for the display of the vertical profile, the reference position computed as a function of the current position of the aircraft, and determining a range of positions for the display of said vertical profile, the range of positions being determined as a function of the computed reference position and a position interval to be displayed.

7. The method according to claim 6, wherein the altitude interval to be displayed depends on the position interval to be displayed.

8. The method according to claim 1, wherein the method further comprises a step for displaying the vertical profile of the aircraft.

9. A non-transitory computer-readable medium including a computer program comprising software instructions which, when executed by a computer, carry out a method according to claim 1.

10. An electronic display management device configured to manage the display of a flight profile of an aircraft, comprising:

a computing module configured to compute a reference altitude for the display of a vertical flight profile, a determining module configured to determine a range of altitudes for the display of said vertical profile, the range of altitudes being determined as a function of the computed reference altitude, wherein the computing module is configured to compute the reference altitude as a function of a current altitude, an altitude interval to be displayed and at least one property relative to an estimated evolution of the altitude of the aircraft from said current altitude, and wherein at least one property relative to an estimated evolution of the altitude of the aircraft is chosen from among the group consisting of: an estimated altitude variation of the aircraft during a next time interval and from the current altitude, a maximum altitude of the aircraft from among the next points of a flight plan and a minimum altitude of the aircraft from among the next points of the flight plan.

11. An electronic system for displaying a flight profile of an aircraft, the system comprising:

a display screen; and an electronic management device configured to manage the display of the flight profile on the display screen, wherein the electronic management device is according to claim 10.

* * * * *